(12) United States Patent
Nason et al.

(10) Patent No.: US 6,593,945 B1
(45) Date of Patent: *Jul. 15, 2003

(54) PARALLEL GRAPHICAL USER INTERFACE

(75) Inventors: D. David Nason, Bainbridge Island, WA (US); Thomas C. O'Rourke, Seattle, WA (US); J. Scott Campbell, Seattle, WA (US)

(73) Assignee: xSides Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/575,333

(22) Filed: May 19, 2000

Related U.S. Application Data
(60) Provisional application No. 60/135,385, filed on May 21, 1999.

(51) Int. Cl.⁷ .................................................. G06F 3/14
(52) U.S. Cl. ........................ 345/779; 345/841; 345/830; 345/826; 345/778
(58) Field of Search ............................. 345/779, 853, 345/854, 762, 839, 836, 835, 810, 840, 841, 778, 784, 786, 830, 832, 774, 825, 811, 826; 709/329, 328, 323, 319

(56) References Cited

U.S. PATENT DOCUMENTS

| | | | |
|---|---|---|---|
| 4,476,464 A | 10/1984 | Hobbs | 340/731 |
| 4,586,035 A | 4/1986 | Baker et al. | 340/712 |
| 4,642,790 A | 2/1987 | Minshull et al. | 364/900 |
| 4,649,499 A | 3/1987 | Sutton et al. | 364/518 |
| 4,710,761 A | 12/1987 | Kapur et al. | 340/721 |
| 4,868,765 A | 9/1989 | Diefendorff | 364/521 |
| 4,972,264 A | 11/1990 | Bishop et al. | 358/183 |
| 5,001,697 A | 3/1991 | Torres | 364/521 |
| 5,036,315 A * | 7/1991 | Gurley | 340/721 |
| 5,060,170 A | 10/1991 | Bourgeois et al. | 364/521 |
| 5,072,412 A | 12/1991 | Henderson, Jr. et al. | 395/159 |
| 5,119,082 A | 6/1992 | Lumelsky et al. | 340/731 |
| 5,146,556 A | 9/1992 | Hullot et al. | 395/159 |
| 5,202,961 A | 4/1993 | Mills et al. | 395/159 |
| 5,305,435 A | 4/1994 | Bronson | 395/159 |
| 5,339,390 A | 8/1994 | Robertson et al. | 395/157 |
| 5,367,623 A | 11/1994 | Iwai et al. | 395/157 |
| 5,367,658 A | 11/1994 | Spear et al. | 395/425 |
| 5,371,871 A | 12/1994 | Spilo | 395/425 |
| 5,394,521 A | 2/1995 | Henderson, Jr. et al. | 395/158 |
| 5,418,572 A | 5/1995 | Nonweiler et al. | 348/446 |
| 5,434,969 A | 7/1995 | Heilveil et al. | 395/166 |

(List continued on next page.)

FOREIGN PATENT DOCUMENTS

| | | |
|---|---|---|
| EP | 0419765 A1 | 4/1991 |
| EP | 0564174 A2 | 10/1993 |
| EP | 0747805 A1 | 12/1996 |

(List continued on next page.)

OTHER PUBLICATIONS

U.S. patent applications Ser. No. 09/344,409, Porter, filed Jun. 24, 1999.
U.S. patent applications Ser. No. 09/517,874, Porter, filed Mar. 2, 2000.

(List continued on next page.)

Primary Examiner—Raymond J. Bayerl
(74) Attorney, Agent, or Firm—Michael J. Donohue; Davis Wright Tremaine LLP

(57) ABSTRACT

A parallel graphical user interface ("GUI") according to the present invention permits use of display spaces having aspect ratios greater than or equal to 3:1. In one example, a parallel GUI includes discrete cartridges which may be added, modified or deleted permitting user specific organization of the cartridges and the functions/links thereon. In another example, a preferred embodiment uses a dial tuning metaphor. A plurality of cartridges compose a bar and each cartridge may be displayed singularly by rotating the bar. Actuation of a selection device such as a button on a cartridge may initiate an application, document, file, utility, network link or simply rotation of the bar.

45 Claims, 13 Drawing Sheets

U.S. PATENT DOCUMENTS

| | | | |
|---|---|---|---|
| 5,473,745 A | 12/1995 | Berry et al. | 395/157 |
| 5,491,795 A | 2/1996 | Beaudet et al. | 395/159 |
| 5,500,934 A | 3/1996 | Austin et al. | 395/755 |
| 5,513,342 A | 4/1996 | Leong et al. | 395/157 |
| 5,521,614 A | 5/1996 | Kotha et al. | 345/128 |
| 5,561,471 A | 10/1996 | Kim et al. | 348/565 |
| 5,568,603 A | 10/1996 | Chen et al. | 395/155 |
| 5,586,244 A | 12/1996 | Berry et al. | 395/340 |
| 5,617,526 A | 4/1997 | Oran et al. | 395/326 |
| 5,621,428 A | 4/1997 | King et al. | 345/118 |
| 5,621,904 A | 4/1997 | Elliott et al. | 395/342 |
| 5,625,782 A | 4/1997 | Soutome et al. | 395/341 |
| 5,651,127 A | 7/1997 | Gove et al. | 395/412 |
| 5,652,851 A | 7/1997 | Stone et al. | 395/346 |
| 5,673,403 A * | 9/1997 | Brown et al. | 395/331 |
| 5,675,755 A | 10/1997 | Trueblood | 395/346 |
| 5,704,050 A | 12/1997 | Redpath | 395/339 |
| 5,724,104 A | 3/1998 | Eom | 348/569 |
| 5,742,797 A | 4/1998 | Celi, Jr. et al. | 395/507 |
| 5,745,109 A | 4/1998 | Nakano et al. | 345/340 |
| 5,757,386 A | 5/1998 | Celi, Jr. et al. | 345/507 |
| 5,764,964 A | 6/1998 | Dwin et al. | 395/509 |
| 5,771,042 A | 6/1998 | Santos-Gomez | 345/342 |
| 5,793,438 A | 8/1998 | Bedard | 348/569 |
| 5,812,132 A | 9/1998 | Goldstein | 345/345 |
| 5,818,416 A | 10/1998 | Hwang | 345/127 |
| 5,825,357 A | 10/1998 | Malamud et al. | 345/340 |
| 5,831,592 A | 11/1998 | Cahill, III | 345/127 |
| 5,838,296 A | 11/1998 | Butler et al. | 345/127 |
| 5,847,709 A | 12/1998 | Card et al. | 345/355 |
| 5,864,347 A | 1/1999 | Inoue | 345/516 |
| 5,874,937 A | 2/1999 | Kesatoshi | 345/127 |
| 5,874,958 A | 2/1999 | Ludolph | 345/339 |
| 5,874,965 A | 2/1999 | Takai et al. | 345/357 |
| 5,940,077 A | 8/1999 | Amro | 345/342 |
| 5,940,610 A | 8/1999 | Baker et al. | 395/559 |
| 5,995,120 A | 11/1999 | Dye | 345/509 |
| 6,002,411 A | 12/1999 | Dye | 345/521 |
| 6,008,803 A | 12/1999 | Rowe et al. | 345/327 |
| 6,018,332 A | 1/2000 | Nason et al. | 345/127 |
| 6,025,841 A | 2/2000 | Finkelstein et al. | 345/342 |
| 6,025,884 A | 2/2000 | Choi | 348/565 |
| 6,067,098 A | 5/2000 | Dye | 345/521 |
| 6,091,430 A | 7/2000 | Bodin et al. | 345/510 |
| 6,094,230 A | 7/2000 | Han | 348/564 |
| 6,108,014 A | 8/2000 | Dye | 345/507 |
| 6,151,059 A | 11/2000 | Schein et al. | 348/13 |
| 6,172,669 B1 | 1/2001 | Murphy et al. | 345/199 |
| 6,185,629 B1 | 2/2001 | Simpson et al. | 710/10 |
| 6,310,603 B1 | 10/2001 | Nason et al. | 345/145 |
| 6,320,577 B1 | 11/2001 | Alexander | 345/339 |
| 6,330,010 B1 | 12/2001 | Nason et al. | 345/802 |
| 6,337,717 B1 | 1/2002 | Nason et al. | 348/567 |
| 6,426,762 B1 | 7/2002 | Nason et al. | 345/788 |
| 6,433,799 B1 | 8/2002 | Nason et al. | 345/802 |
| 6,437,809 B1 | 8/2002 | Nason et al. | 345/778 |

FOREIGN PATENT DOCUMENTS

| | | |
|---|---|---|
| JP | 11167478 | 6/1999 |
| WO | WO 96/34467 | 10/1996 |
| WO | WO 97/21183 | 6/1997 |
| WO | WO 99/27517 | 6/1999 |

OTHER PUBLICATIONS

Brunhoff, "Pleasing the Eye," *Unix Review* 7(10):65–72, 1989.

Cohen et al., "Constraint–Based Tiled Windows," *IEEE Computer Society Press*, pp. 35–45, 1986.

"Control Strip en Desktop Strip," *Apple World Magazine*, pp. 6132–6133, XP002152897, Jul.–Aug., 1995.

"Coordinating Multiple Graphical User Interfaces Video Access," *IBM Technical Disclosure Bulletin* 39(5):7–9, XP000584036, May 1996.

"Flexible Tool Bar," *IBM Technical Disclosure Bulletin* 36(08):91, XP000390153, Aug. 1993.

Gancarz, "Uwm: A User Interface for X Windows," Summer Conference Proceedings, USENIX Association, pp. 429–440, Jun. 9–13, 1986.

"Internet Kiosk Touch Panel Shell," *IBM Technical Disclosure Bulletin* 39(08):85–87, XP000638146, Aug. 1996.

Lantz et al., "Virtual Terminal Management in a Multiple Process Environment," *Proceedings of the Seventh Symposium on Operating Systems Principles, Association for Computing Machinery*, pp. 86–97, Dec. 10–12, 1979.

"Method and Apparatus for a Graphical Dial Interface," *IBM Technical Disclosure Bulletin* 37(01):403, AP000428826, Jan. 1994.

Meyrowitz et al., "BRUWIN: An Adaptable Design Strategy for Window Manager/Virtual Terminal Systems," *Proceedings of the Eighth Symposium on Operating Systems Principles, Association for Computing Machinery*, pp. 180–189, Dec. 14–16, 1981.

"Single–Click Action Buttons," *IBM Technical Disclosure Bulletin* 37(03):93, XP000441391, Mar. 1994.

Stille et al., "$A^2DL$–An Adaptive Automatic Display Layout System," *Third Annual Symposium on Human Interaction with Complex Systems HICS'96*, IEEE Computer Society Press, pp. 243–250.

"Three–Dimensional Selection Widget," *IBM Technical Disclosure Bulletin* 38(02):423, XP000502528, Feb. 1995.

Van Name et al., "Easing the RAM–Cram Blues," *Byte* 15(3):227–228, 230, 232, 234, XP000652459, Mar. 1990.

* cited by examiner

PARALLEL GRAPHICAL USER INTERFACE

CROSS-REFERENCE TO RELATED APPLICATION

This application claims the benefit of U.S. Provisional Patent Application No. 60/135,385 filed May 21, 1999Expired, where this provisional application is incorporated herein by reference in its entirety.

TECHNICAL FIELD

This invention relates to computer user interfaces and more specifically to a parallel graphical user interface for a digital computer.

BACKGROUND OF THE INVENTION

The advent of the computer age saw users struggling with text based interfaces to manage and use a computer. The introduction of graphical user interfaces simplified computer use and prompted many people to buy and use computers. Generally, a computer has a single "primary" graphical user interface and all other programs run under it. As computer processor speed and complexity has increased it has become possible for computers and their displays to handle more and more tasks simultaneously as illustrated by the growth of multitasking applications. There is no more reason for a computer user to be limited to a single graphical user interface for computer control and interaction.

What is needed is a parallel graphical user interface that may be used with conventional user interfaces to allow a computer user to exploit the capability of conventional displays and processors with a minimal impact on the functionality of the conventional user interfaces.

SUMMARY OF THE INVENTION

In a first aspect, the present invention includes a parallel graphical user interface (GUI) modeled as a dial tuning metaphor. This provides an intuitive interface that remains useable in spaces with high aspect ratios for convenient use in parallel with another more conventional GUI to increase the efficiency of a users computer experience.

In another aspect of the present invention, a GUI according to the present invention may operate in display areas having aspect ratios of 3:1 or greater.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE INVENTION

Figure 1:
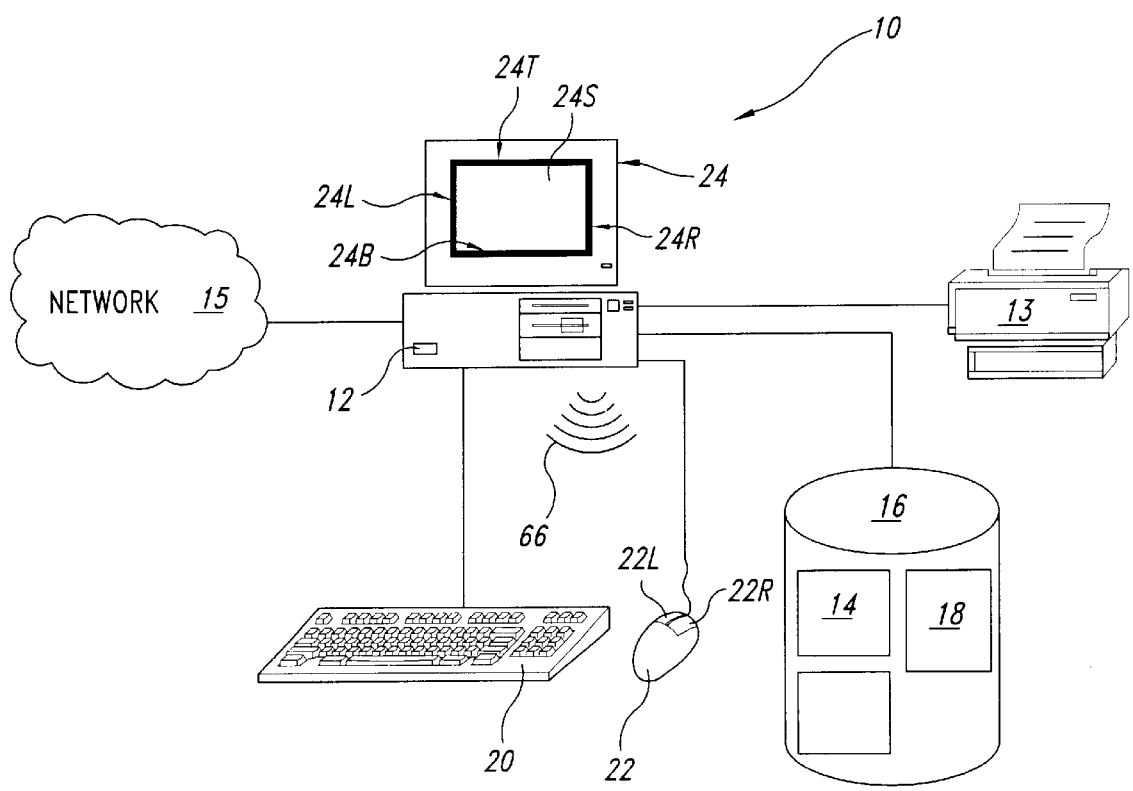
FIG. 1 is a block diagram of an example computer apparatus according to the present invention.

Referring now to FIG. 1, the general architecture of a digital computer system 10 for implementing the present invention is shown. The present invention may be implemented in any electronic device presenting a GUI on a display for user control and interaction. Processor 12 may be any conventional digital computer processor running any appropriate conventional operating system such as the Windows 98™ operating system (Windows 98™ is a registered trademark of the Microsoft Corporation of Redmond Washington). System software 14 may be stored on storage unit 16 which may be any conventional storage device such as an internal fixed disk drive or any other conventional device. Also preferably stored on storage unit 16 may be parallel GUI software 18 as described in greater detail below. An interactive user input, where referenced below, may be provided via any standard input peripherals such as keyboard 20 and/or mouse 22. Graphical output created by processor 12 under control of GUI software 18 may be transmitted to any conventional display device such as video monitor 24 for display to users; equivalently, output may also be transmitted to any conventional hard copy output device to generate conventional hard copy output such as printer 13. Computer system 10 may also be connected to a network such as network 15.

Figure 2:
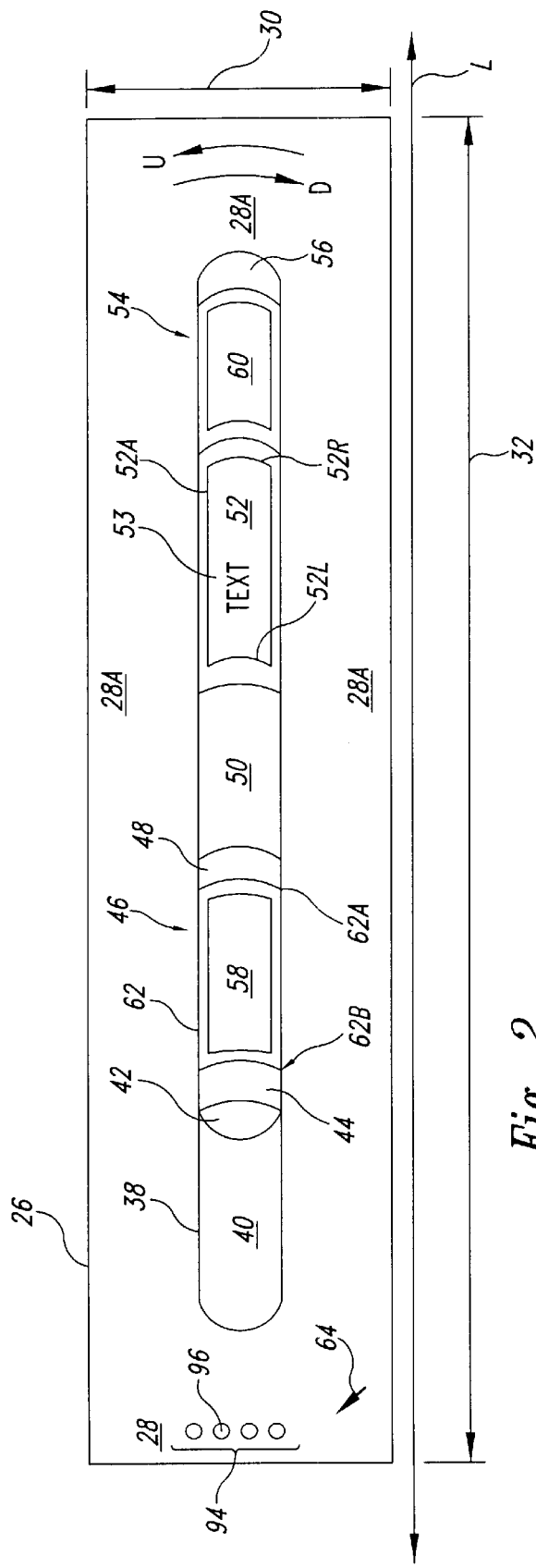
FIG. 2 is a line drawing of an example parallel GUI according to a first embodiment of the present invention.

Referring now to FIG. 2, display area 26 includes a parallel GUI 28 according to the present invention. Display area 26 may be located anywhere on screen 24S of video monitor 24. For example, with long axis L oriented horizontally display area 26 may be located adjacent edge 24T or edge 24B. Alternatively, with long axis L oriented vertically, display area 26 may be located adjacent edge 24L or edge 24R.

Aspect ratio 34 of parallel GUI 28 is the relationship between dimension 32 measured along long axis L and dimension 30 expressed as 34:1 where aspect ratio 34 is determined by equation 36.

36 →Aspect ratio 34=dimension 32÷dimension 30

According to the preferred embodiment of the present invention, parallel GUI 28 includes bar 38 surrounded by area 28A. Bar 38 may include one or more containers or cartridges such as cartridge 86 of FIG. 3. Area 28A may be any color, in one preferred embodiment, area 28A is black. Bar 38 may be composed of separate elements such as title area 40, one or more help areas such as help area 42 and or help area 56, one or more rotators such as rotator 44 and or rotator 48, and one or more buttons such as button 46, button 50, ticker 52 and button 54. A button may be depressible such as button 46 or non-depressible such as button 40. A depressible button such as button 46 may perform an associated action and display highlighting when selected and clicked on using any conventional pointing device such as mouse 22. A non-depressible button such as button 40 may act as a label and or initiate apparent rotation of the elements of bar 38 to the right of button 40 along with all the associated sound, apparent motion, and highlighting as described below.

Examples of some of the possible behaviors of bar 38 are now described.

During a 'mouse over' condition, that is when a pointer such as arrow 64 is moved over a depressible button such as button 46, the appearance of button frame 62 may be changed such as by changing its color and thus the apparent intensity of emitted light. The change evoked in a button frame such as button frame 62 may be localized to a portion of the button frame such as comer 62A. In a currently preferred embodiment of the present invention, a 'mouse over' condition causes light to apparently emit from the lower left comer of the button frame such as comer 62B.

Clicking on or 'mouse down' condition of a depressible button such as button 46 may evoke apparent movement of the button and or apparent lighting changes adjacent the effected button. In a currently preferred embodiment of the present invention, 'mouse down' of a depressible button such as button 46 causes button 46 to apparently move into bar 38 and an apparent increase of light from behind button frame 62. Apparent motion and light emission changes may be accomplished by any conventional means.

Following a click on or 'mouse down' condition of a depressible button such as button 46 a 'mouse up' condition is initiated thus completing a button selection cycle. A 'mouse up' condition may initiate an action such a hyperlink or launch an application associated with the acting button such as button 46. Additionally, a 'mouse up' condition may cause a button such as button 46 to reverse the apparent motion caused by the prior 'mouse down' condition, thus as in the prior example, button 46 apparently springs back out of bar 38 into alignment with bar 38. At the conclusion of a button selection cycle, a highlighting change of a selected button may also be included. In a currently preferred embodiment of the present invention, a post selection highlighting is the same as the earlier described 'mouse over' highlighting and is maintained until another button such as button 54 is selected or some other action within parallel GUI 28 is initiated.

Actuation of a complete button selection cycle on a non-depressible button such as button 50, a title button such as title area 40, or on a rotator such as rotator 44 may initiate rotation about long axis L of the display area. In a currently preferred embodiment of the present invention a click of right mouse button 22R initiates rotation of 38 in a first direction D and a click of left mouse button 22L initiates rotation of 38 in a second direction U, opposite first direction D.

Accompanying a complete button selection cycle as described above, sound may be used to enhance the experience and thus heighten the similarity of a virtual metaphor to a real 3-dimensional device. In a currently preferred embodiment of the present invention, sound 66 may issue from computer system 10, sound 66 may resemble a sound or sounds issued from a real device such as a subtle mechanical click. Any other appropriate sound or sounds may also be used.

A non-depressible button such as button 50 may be used a title button or a placeholder, and thus may not invoke a utility, URL or any other function if subjected to a complete button selection cycle. Accordingly, no highlighting or other special indicia would accompany a 'mouse over' condition of a non-depressible button such as button 50. In an alternate embodiment of the present invention, a non-depressible button such as button 50 may include the functionality of a rotator such as rotator 44 or 48. Thus a complete button selection cycle on such a non-depressible button would result in the apparent rotation of non-depressible button 50 and all the elements of bar 38 to its right such as ticker 52 and button 60.

Figure 3:
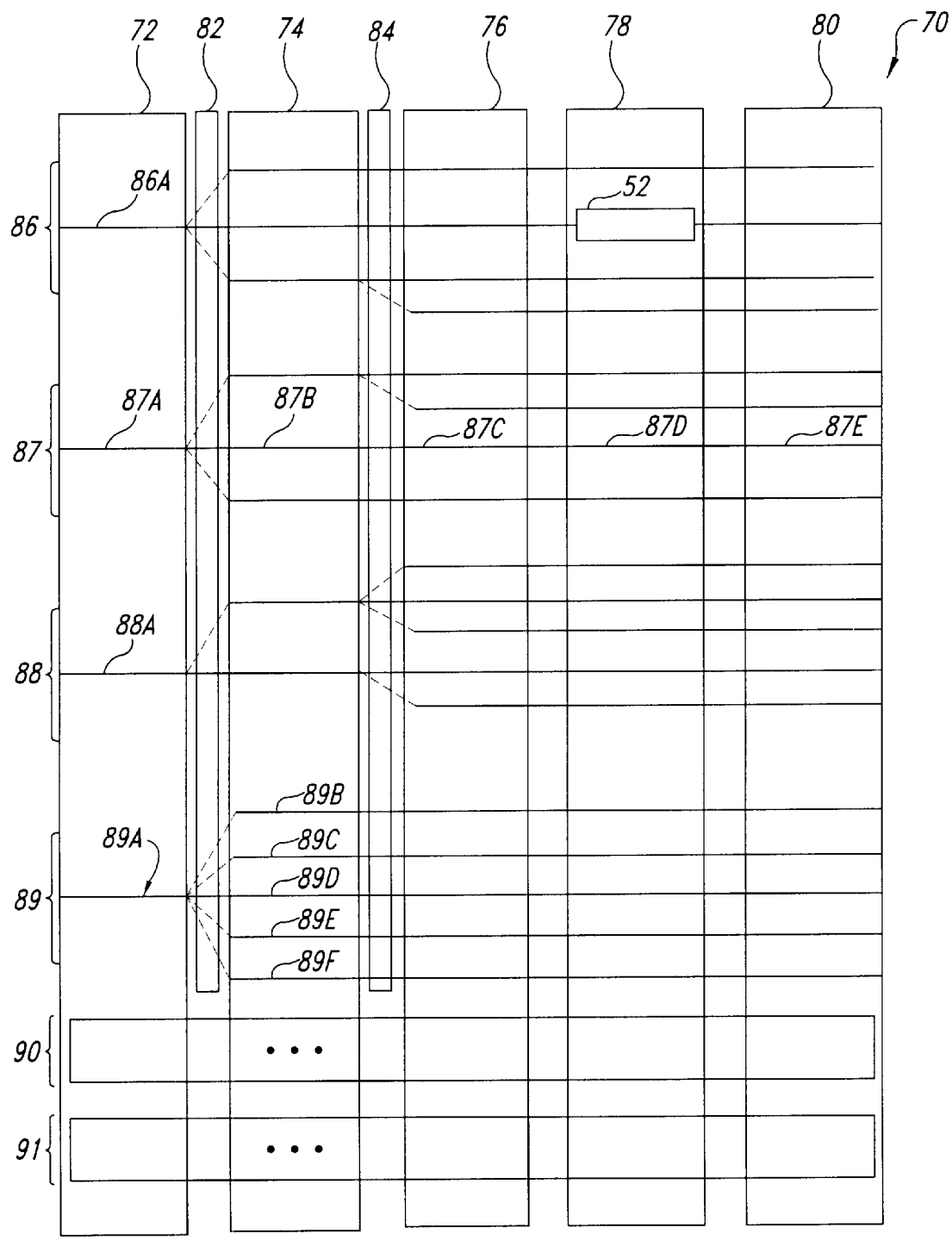
FIG. 3 is a simplified example of a menu tree according to the present invention.
Figure 5:
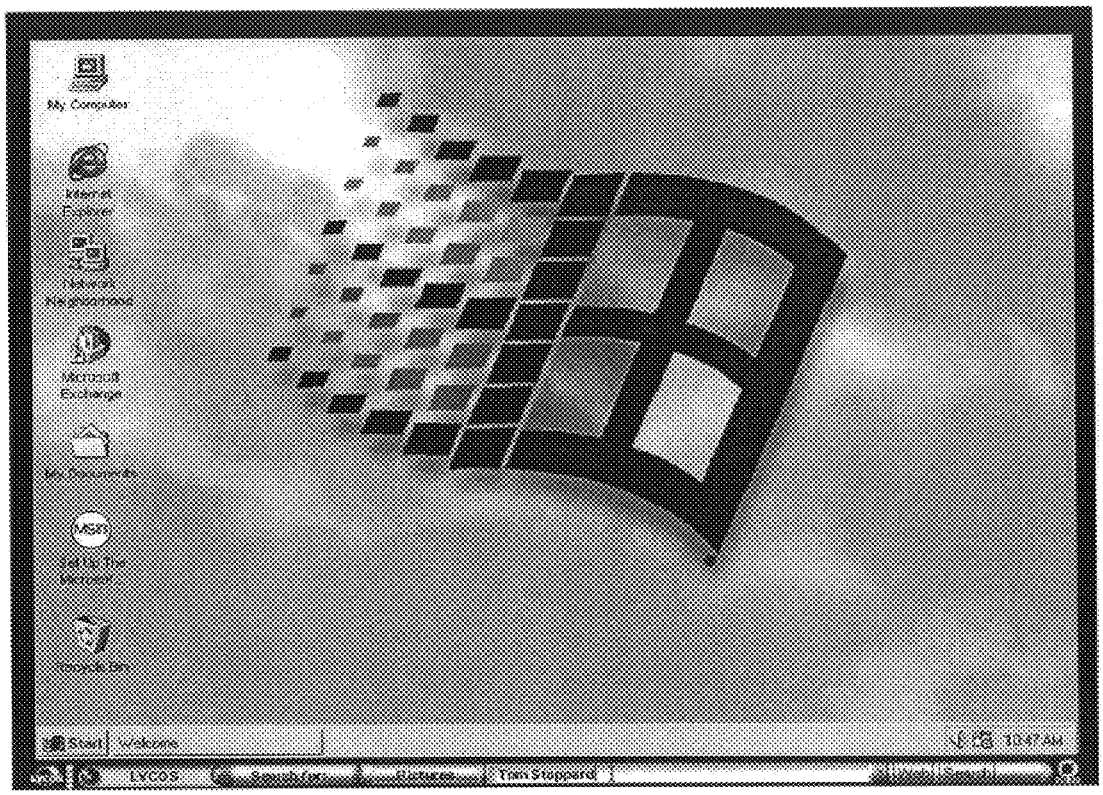
FIGS. 5–14 are example screen images from an example parallel GUI.
Figure 6:
Figure 7:
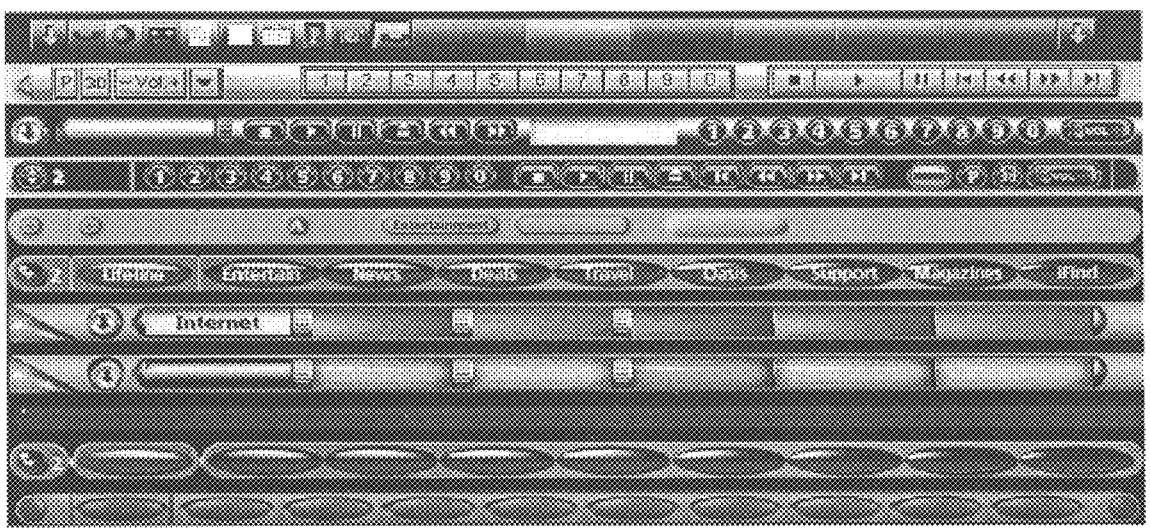
Figure 8:
Figure 9:
Figure 10:
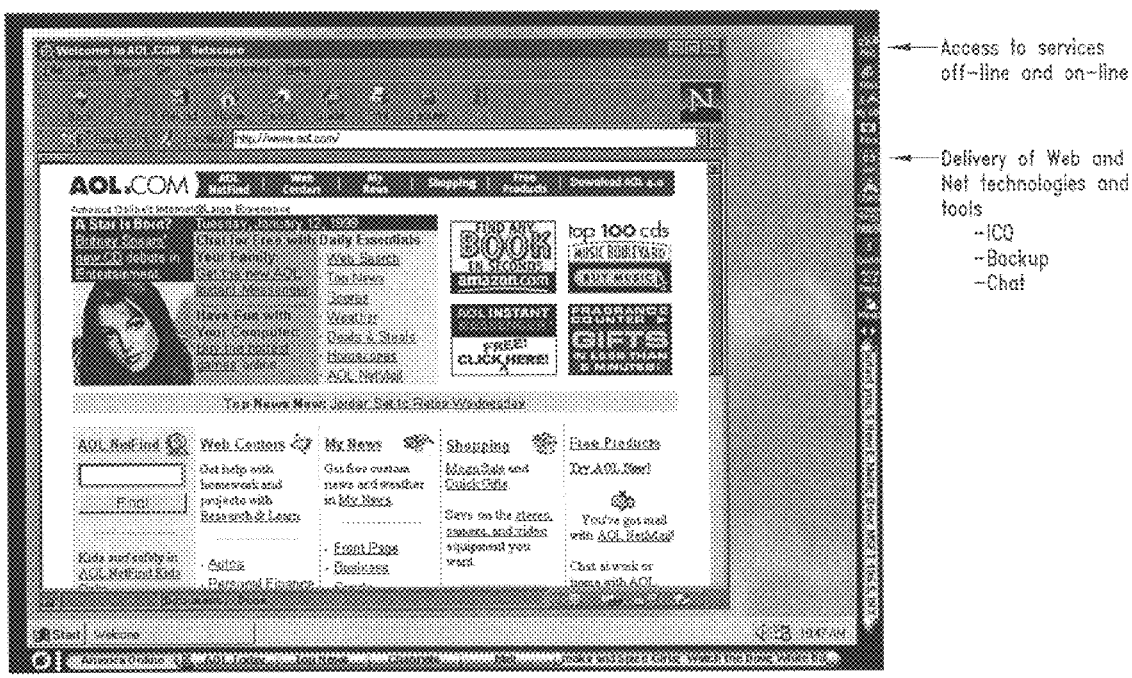
Figure 11:
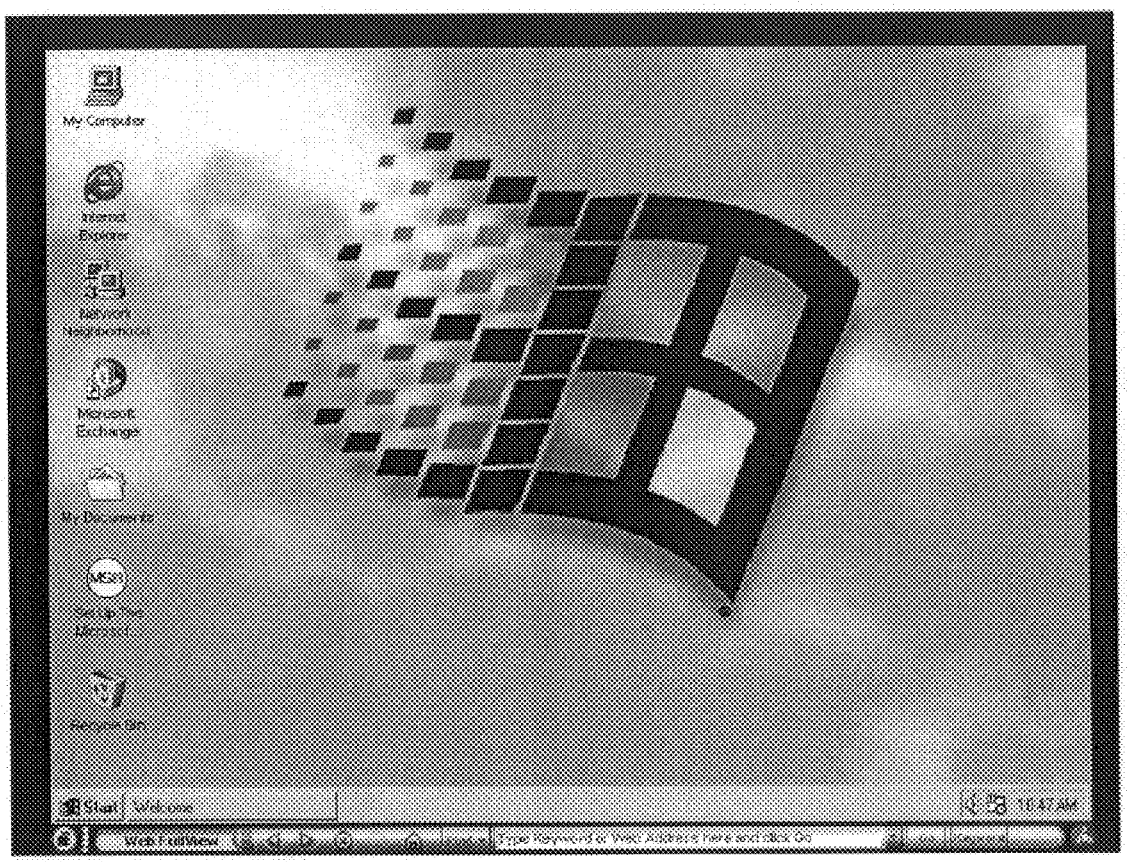
Figure 12:
Figure 13:
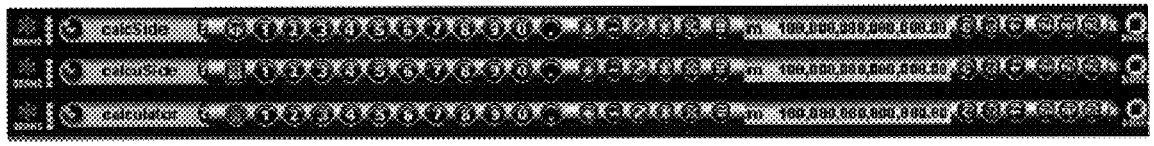
Figure 14:
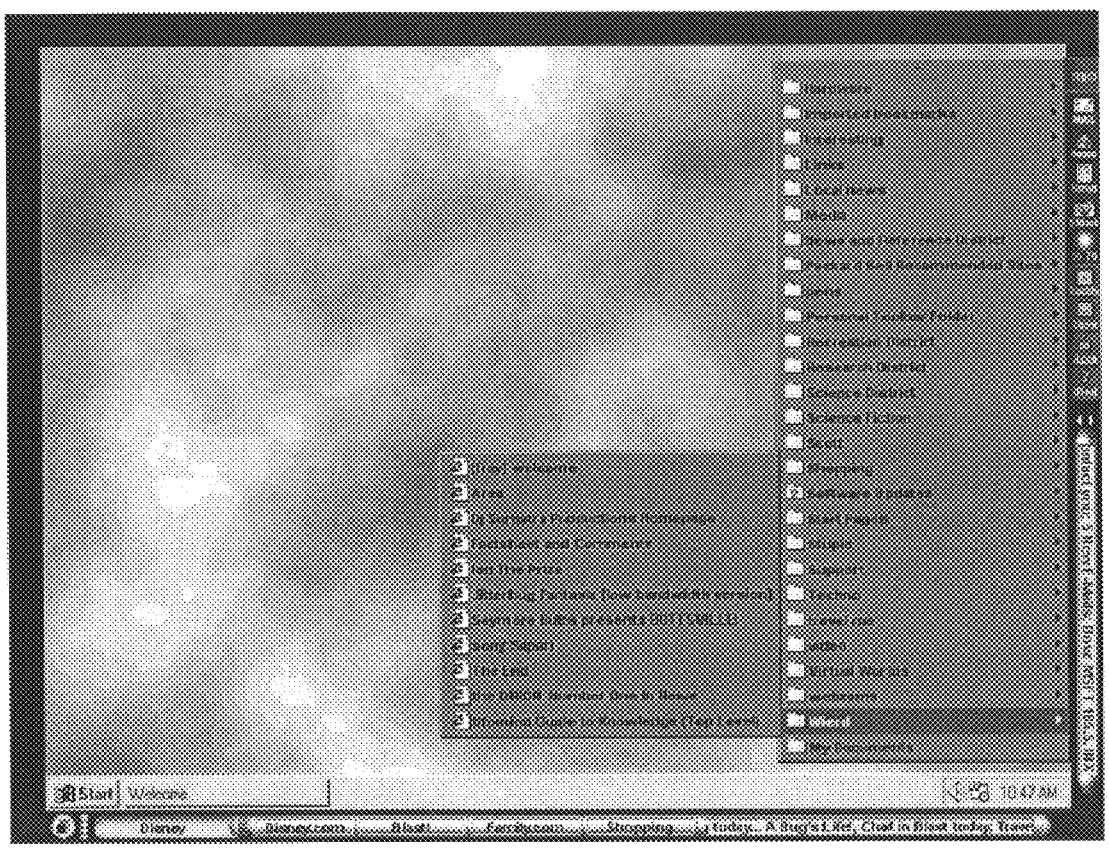

Tickers such as ticker 52 may be dynamic reading areas within a cartridge such as cartridge 86 as shown in FIG. 3. Scrolling updateable text such as text 53 can be displayed and the text reading area can also be dynamically linked to launchy an application or URL. A ticker such as ticker 52 may be as long as a single button or any combination of multiple buttons. The text such as text 53 that is displayed may be scrolling or otherwise made to move through ticker window 52A. In a currently preferred embodiment of the present invention text enters ticker window 52A at right side 52R and scrolls to the left to left side 52L. The scrolling text such as text 53 may repeat in a loop at the end of the text string. Ticker text such as text 53 may be updated locally or over a network such as network 15. A ticker such as ticker 52 may activate a hyperlink through a network such as network 15 when ticker 52 is clicked on, or subjected to a complete button cycle.

Referring now to FIG. 3, an example of a menu tree that may be displayed and accessed through parallel GUI 28 is shown. Menu 70 includes title bands 72, 74, 76, 78 and 80 which correspond to title area 40, button 46, button 50, ticker 52 and button 54 respectively. Rotators 44 and 48 are represented by bands 82 and 84 respectively. In this example, title area 40 includes 6 containers or cartridges, cartridges 86, 87, 88, 89, 90 and cartridge 91. Many more cartridges and titles may be available, the number of cartridges or titles available may only be limited by the resources of the computer. Cartridges such as cartridge 90 or cartridge 91 may include accessories such as a web browser or media player or any other accessory. Accessories for a cartridge such as cartridge 90 may be installed for use with system software 14, or they may be components of parallel GUI software 18, or they may be available via a network such as network 15.

Figure 4:
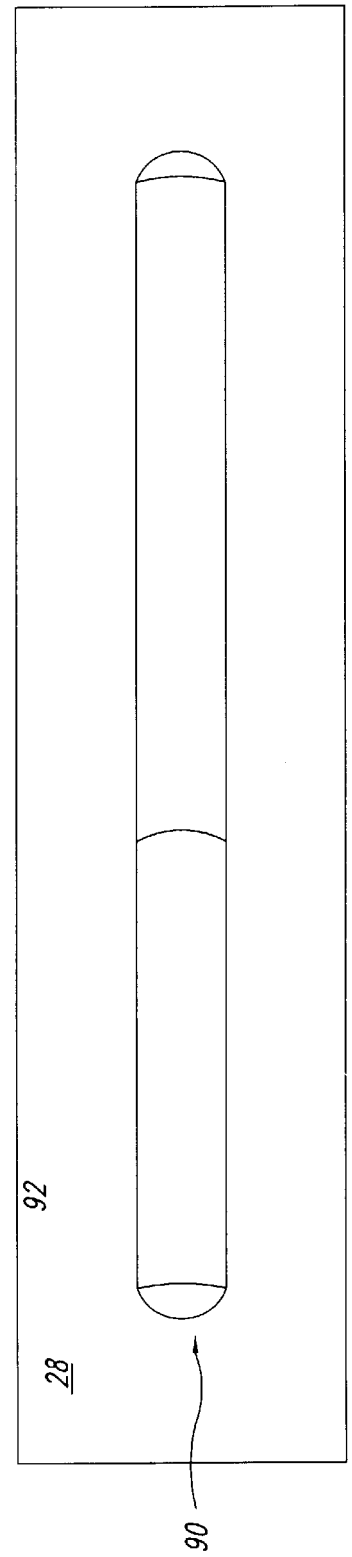
FIG. 4 is a line drawing of an example parallel GUI with an accessory container or cartridge according to an embodiment of the present invention.

Referring now to FIG. 4, parallel GUI 28 is shown with accessory cartridge 90 visible. Accessory cartridge 90 may include function specific actuators such as fast forward or next track for a CD player. A section of accessory cartridge 90 or any other cartridge selected may also be dedicated to a single function such as web browser 92, to permit the browser to remain visible at all times that parallel GUI software 18 is running.

Cartridges such as cartridges 86-91 may be pre-loaded with links and accessories. Alternatively, the elements or buttons of a cartridge may be blank for loading by a user. User cartridge(s) may include access to applications, documents, files, or network links such as URLs and or embedded functions. Some embedded functions which may be launched from a cartridge may include, for example, a browser, an MP3 player, instant messaging, trading notices for marketplace functions, alerts for auction results and or trades, agent checking regarding price comparison searches. User items such as, for example, applications, documents, files, or network links may be added to a user button via any conventional method such as copy and paste or drag and drop functions of system software 14 or of any web browser. In addition, the button may include access to an application which interprets text that is entered into an area on the button itself. In a currently preferred embodiment of the present invention user buttons may be renamed or cleared in any conventional manner.

A parallel GUI such as parallel GUI 28 may also include a help function. Help screens or menus may be implemented in any conventional manner. A map of the contents and organization of bar 38 may be provided in the form of a menu or tree such as menu 70 of FIG. 3. Menu 70 and other help screens may extend from display area 26 in any conventional manner. In a currently preferred embodiment of the present invention in which menu 70 is visible extending away from edge 26T thus allowing bar 38 to remain visible, actuation of a complete button cycle on a title such as title 87C will initiate rotation of bar 38 to bring cartridge 87 and title 87C to visibility on bar 38.

In a currently preferred embodiment of the present invention display area 26 includes 4 preset actuators 94. Activation of a complete button cycle on an actuator such as actuator 96 will rotate bar 38 to a pre-selected position. A user may initially load, change or delete a preset setting associated with an actuator such as actuator 96.

Parallel GUI software 18 may also include a screen saver component such as idle component 96. If parallel GUI 28 is notified that system software 14 is in idle, rather than blanking display area 26 as in some conventional techniques, parallel GUI 28 may auto rotate through all possible cartridge displays of menu 70. When system software 14 returns to active mode, bar 38 will automatically return to the last active position prior to idle.

If parallel GUI 28 is oriented with a title cartridge such as cartridge 86 with title 86A visible on title area 40, a complete button cycle of title area 40 as described above may result in apparent rotation of bar 38 and thus display an adjacent cartridge such as cartridge 87 or cartridge 85 (not shown). Title area 40 may also include all buttons and rotators to the right of title area 40 as well. In an alternate embodiment, a complete button cycle of title area 40 changes the visible title such as title 86 and apparently rotates elements of bar 38 to the right of title area 40 such as rotator 44, rotator 48, button 46, button 50, ticker 52 and button 54. The result of changing a cartridge and thus the title visible in title area 40 is that as cartridge 87 is visible, title 87A may be visible as well as a set of it's subordinate titles such as titles 87B, 87C, 87D and 87E. Additional cycling of title area 40 will result in display of additional cartridges and thus additional titles of band 72 such as titles 88A and 89A.

If title 89A is visible in band 72, execution of a complete button cycle on rotator 44 corresponding to band 82 will cause apparent rotation of bar 38 at button 46 corresponding to band 74 including everything to the right of button 46. Subsequent button cycles of a rotator such as rotator 44 cause titles which appear on button 46 to sequentially cycle through titles 89B, 89C, 89D, 89E and 89F with a new title appearing after each button cycle.

In a currently preferred embodiment of the present invention a merge function may be included to allow cartridges such as cartridges 86–91 to be added to an existing parallel GUI such as parallel GUI 28. A cartridge such as cartridge 86 may be added or merged with any existing cartridges in a parallel GUI such as parallel GUI 28 using any conventional technique such as copy and paste or drag and drop. A merged cartridge such as cartridge 86 may be added between any two adjacent cartridges such as cartridges 88 and 89. Similarly, existing cartridges may be reordered using a conventional sort function.

New cartridges may be merged or added to an existing parallel GUI from any conventional media such as magnetic storage media, optical storage media, or from network resources such as the Internet, or any local or intranet network. A delete and or a sort function may also be included to permit a user to organize or personalize a bar such as bar 38 in parallel GUI according to their own wishes consistent with parallel GUI software 18.

Although specific embodiments of, and examples for the present invention are described herein for illustrative purposes, it is not intended that the invention be limited to these embodiments. Equivalent methods, structures, processes, steps, and other modifications within the spirit of the invention fall within the scope of the invention. Also, those skilled in this art will understand how to make changes and modifications to the present invention to meet their specific requirements or conditions. For example, the teachings provided herein of the present invention can be applied to other types of computer systems, including those that control non-integrated display surfaces. Also, for example, the teachings provided herein can be applied to other types of user interface elements and other behaviors of such user interface elements. In addition, the teachings may be applied to other types of devices that have display surfaces and other organizations of computer operating systems and environments. These and other changes may be made to the invention in light of the above detailed description. Accordingly, the invention is not limited by the disclosure and is set forth in the following claims.

What is claimed is:

1. A method in a computer system for presenting on a video display system a supplemental user interface that is used in conjunction with a user interface of a computer operating system, comprising:
    under the control of code outside of the control of the operating system,
    presenting an image on the video display system of a graphical bar having at least one cartridge and at least one user interface element associated with a behavior;
    receiving an indication of a selection of the element; and
    performing the behavior associated with the element.

2. The method of claim 1 wherein the graphical bar further comprises a plurality of user interface elements.

3. The method of claim 1 wherein the user interface element is linked to executable code that is launched when the behavior associated with the element is performed.

4. The method of claim 1 wherein the user interface element is associated with an indicator to a web page that is accessed when the behavior associated with the element is performed.

5. The method of claim 1 wherein the graphical bar further comprises a plurality of cartridges that are dynamically merged into the bar.

6. The method of claim 5 wherein each cartridge includes a set of user interface elements that behave independently from the user elements of a different cartridge.

7. The method of claim 5 wherein the bar includes a rotator as the at least one user interface element, and wherein a particular cartridge is displayed when an indication is received that the rotator has been selected.

8. The method of claim 1 wherein the bar appears alongside the user interface of the computer operating system and is used to quickly access pre-selected capabilities.

9. The method of claim 1 wherein the bar is displayable with different graphical appearances.

10. The method of claim 9 wherein one of the graphical appearances resembles a dial based tuner.

11. The method of claim 9, the bar having a plurality of cartridges, where at least two cartridges are displayed with different graphical appearances.

12. The method of claim 1 wherein the at least one user interface element is a title area that displays a title.

13. The method of claim 1 wherein the at least one user interface element is a rotator which causes a portion of the bar to rotate when an indication has been received that the rotator has been selected.

14. The method of claim 1 wherein the at least one user interface element is a help button.

15. The method of claim 1 wherein the at least one user interface element is a depressible button which performs a behavior when an indication has been received that the button is depressed.

16. The method of claim 1 wherein the at least one user interface element is a non-depressible button which acts as a label to a portion of the bar.

17. The method of claim 1 wherein the at least one user interface element is a ticker which displays dynamically scrolling text.

18. A system for presenting on a video display system associated with an apparatus under control of a computer operating system a supplemental user interface that is used in conjunction with a user interface of the apparatus under the control of code outside the computer operating system, comprising:

an image rendering system that presents a graphical bar image on the video display system, the bar having at least one cartridge and at least one user interface element associated with a behavior; and;

a supplemental user interface that receives an indication of a selection of the element and performs the behavior associated with the element.

19. The system of claim 18 wherein the bar includes a plurality of cartridges.

20. The system of claim 19 wherein the plurality of cartridges can be dynamically merged and deleted from the bar.

21. The system of claim 18 wherein the bar includes a rotator as the at least one user interface element, and wherein a particular cartridge is displayed when an indication is received by the supplemental user interface that the rotator has been selected.

22. The system of claim 18 wherein the bar includes a plurality of user interface elements.

23. The system of claim 18 wherein the user interface element is linked to executable code that is launched by the supplemental user interface when the behavior associated with the element is performed.

24. The system of claim 18 wherein the user interface element is associated with an indicator to a web page that is accessed when the behavior associated with the element is performed.

25. The system of claim 18 wherein each cartridge includes a set of user interface elements that behave independently from the user elements of a different cartridge.

26. The system of claim 18 wherein the bar includes a rotator as the at least one user interface element, and wherein a particular cartridge is displayed when an indication is received that the rotator has been selected.

27. The system of claim 18 wherein the bar appears alongside the separately controlled user interface and is used to quickly access pre-selected capabilities.

28. The system of claim 18 wherein the bar is displayable with different graphical appearances.

29. The system of claim 18 wherein one of the graphical appearances resembles a dial based tuner.

30. The system of claim 18, the bar having a plurality of cartridges, where at least two cartridges are displayed with different graphical appearances.

31. The system of claim 18 wherein the at least one user interface element is a title area that displays a title.

32. The system of claim 18 wherein the at least one user interface element is a rotator which causes a portion of the bar to rotate when an indication has been received that the rotator has been selected.

33. The system of claim 18 wherein the at least one user interface element is a help button.

34. The system of claim 18 wherein the at least one user interface element is a depressible button which performs a behavior when an indication has been received that the button is depressed.

35. The system of claim 18 wherein the at least one user interface element is a non-depressible button which acts as a label to a portion of the bar.

36. The system of claim 18 wherein the at least one user interface element is a ticker which displays dynamically scrolling text.

37. A computer-readable medium containing instructions for controlling a computer processor to present on a video display system under control of a computer operating system a supplemental user interface that is used in conjunction with a user interface of an apparatus associated with the video display system under the control of code outside the computer operating system by:

presenting an image on the video display system of a graphical bar having at least one cartridge and at least one user interface element associated with a behavior;

receiving an indication of a selection of the element; and performing the behavior associated with the element.

38. The computer-readable medium of claim 37 wherein the graphical bar has a plurality of cartridges that are displayed one at a time.

39. The computer-readable medium of claim 38 wherein each cartridge has a plurality of user interface elements, each element being one of the set of depressible buttons, non-depressible buttons, rotators, tickers, and titles.

40. The computer-readable medium of claim 38 wherein at least two cartridges are displayable using different graphical appearances.

41. The computer-readable medium of claim 37 wherein the cartridge has a plurality of user interface elements, each element being one of the set of depressible buttons, non-depressible buttons, rotators, tickers, and titles.

42. The computer-readable medium of claim 37 wherein the bar appears alongside the separately controlled user interface and is used to quickly access pre-selected capabilities.

43. The computer-readable medium of claim 37 wherein the user interface element provides access to a web page.

44. The computer-readable medium of claim 37 wherein the user interface element provides access to an executable program.

45. The computer-readable medium of claim 37 wherein the user interface element accepts input and performs a behavior based upon receiving the input.

\* \* \* \* \*